United States Patent Office 3,389,309
Patented June 18, 1968

3,389,309
CONTROL SYSTEMS
Niels C. Andersen, St. Louis, and Harold J. Barmeier, Jr., St. Louis County, Mo., assignors to Sperry Rand Corporation, New York, N.Y., a corporation of Delaware
Filed Mar. 10, 1965, Ser. No. 438,475
9 Claims. (Cl. 317—123)

ABSTRACT OF THE DISCLOSURE

A testing device for the testing of components, which are very sensitive to magnetic fields, includes a high permeability enclosure with a D.C. winding within that enclosure to develop a magnetc field which can be used to test the components. The testing device also includes a winding which develops an alternating magnetic field within the enclosure to avoid establishing a permanent magnetic field within the enclosure.

---

Figure 1:
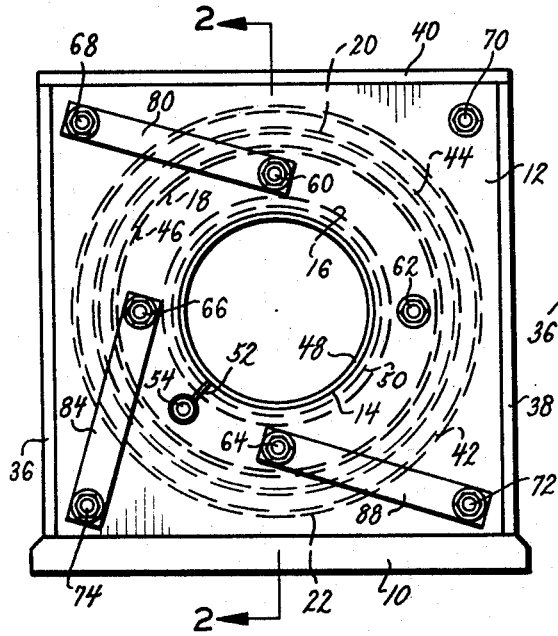

This invention relates to improvements in control systems. More particularly, this invention relates to improvements in devices for testing magnetic-sensitive components of control systems.

It is, therefore, an object of the present invention to provide an improved device for testing magnetic-sensitive components of control systems.

It is frequently necessary to test a component, of a control system, which is sensitive to magnetic fields; and, in testing such a component, it is customary to dispose that component adjacent to a D.C. winding and to dispose that component and that winding within an enclosure of very high permeability magnetic material. The D.C. winding will develop a controlled magnetic field to test the magnetic-sensitive component; and the enclosure will keep external magnetic fields from adversely affecting the testing of that component. Such a testing arrangement is quite effective where the components to be tested are of normal sensitivity; but, where very sensitive components are to be tested, such a testing arrangement is not adequate. Specifically, the controlled magnetic field developed by the D.C. winding tends to establish a permanent magnetic field in the enclosure of high permeability magnetic material, and such a permanent magnetic field interferes with the testing of the magnetic-sensitive components. It would be desirable to provide a testing arrangement for the testing of components, which are very sensitive to magnetic fields, that would have a D.C. winding and an enclosure of high permeability magnetic material and that would avoid the establishing of a permanent magnetic field in that enclosure. The present invention provides such a testing arrangement; and it does so by developing an alternating magnetic field in that enclosure. It is, therefore, an object of the present invention to provide a high permeability enclosure for a D.C. winding and for a magnetic-sensitive component, and to develop an alternating magnetic field in that enclosure.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is an end elevational view of one form of testing device that is made in accordance with the principles and teachings of the present invention.

Figure 3:
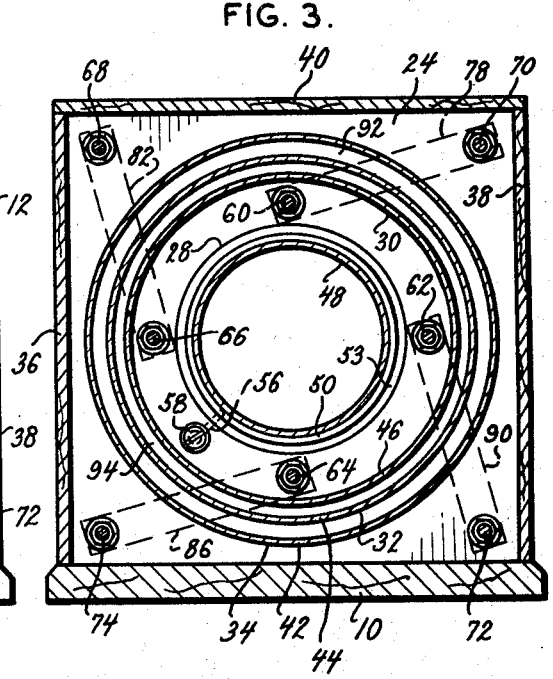
Figure 2:
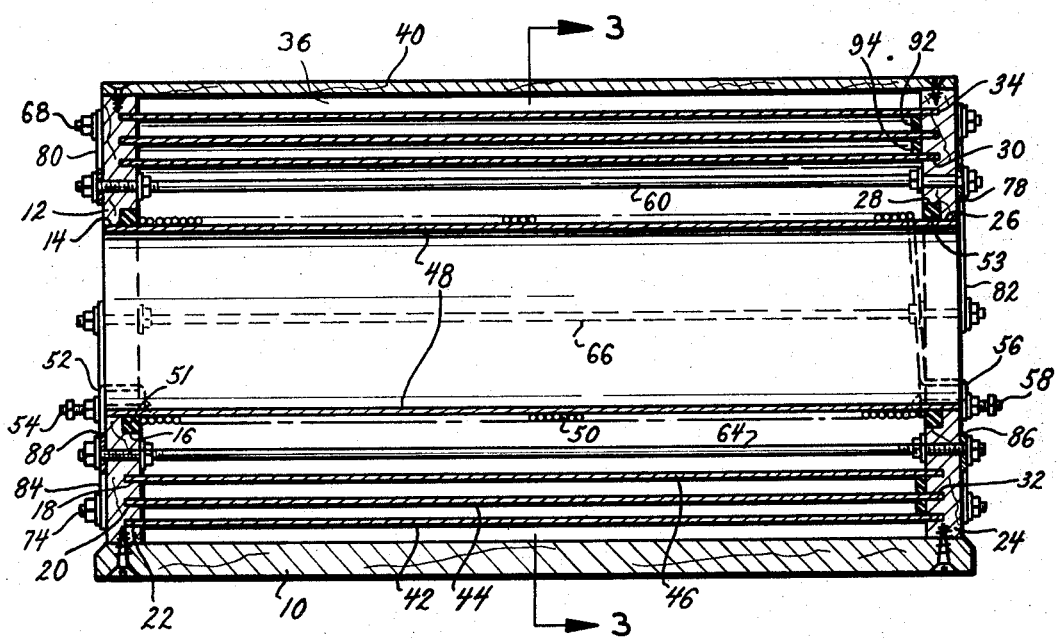

FIG. 2 is a sectional view through the testing device shown in FIG. 1, and is taken along the plane indicated by the line 2—2 in FIG. 1, and FIG. 3 is another sectional view through the testing device shown in FIG. 1, and is taken along the plane indicated by the line 3—3 in FIG. 2.

Referring to the drawing in detail, the numeral 10 denotes a base for one preferred embodiment of testing device that is made in accordance with the principles and teachings of the present invention. A front wall 12, that is square in elevation, is secured to the base 10; and that wall has a central opening 14 of circular configuration. An annular recess 16 is formed at the inner face of the front wall 12; and that recess is concentric with and abuts the opening 14. Annular grooves 18, 20 and 22 are formed in the inner face of the front wall 12; and those grooves also are concentric with the opening 14. A rear wall 24, which is similar to the front wall 12, is secured to the rear of the base 10. The opening 26 in the rear wall 24 is in register with the opening 14 in the front wall 12, and the annular recess 28 in the inner face of that rear wall is in register with the annular recess 16 in the inner face of that front wall. The annular grooves 30, 32 and 34 in the inner face of the rear wall 24 are, respectively, in register with the annular grooves 18, 20 and 22 in the inner face of the front wall 12. Side walls 36 and 38 and a top 40 are suitably secured to the front and rear walls 12 and 24. The base 10, the front and rear walls 12 and 24, the side walls 36 and 38, and the top 40 are made of a non-magnetic material; and wood is one such material.

The numeral 42 denotes a tube of high permeability magnetic material; and the ends of that tube are disposed within the annular grooves 22 and 34, respectively, in the inner faces of the front and rear walls 12 and 24. A tube 44 of high permeability magnetic material is telescoped within the tube 42; and the opposite ends of the tube 44 are disposed within the annular grooves 20 and 32, respectively, in the inner faces of the front and rear walls 12 and 24. A tube 46 of high permeability magnetic material is telescoped within the tube 44; and the opposite ends of the tube 46 are disposed within the annular grooves 18 and 30, respectively, in the inner faces of the front and rear walls 12 and 24. In said preferred embodiment of the present invention, the tube 42 is thicker than either of the tubes 44 and 46, and the permeability of the magnetic material in that tube is not as high as the permeability of the magnetic material in either of the tubes 44 and 46. The tube 46 is thinner than either of the tubes 42 and 44, and permeability of the magnetic material in that tube is higher than the permeability of the magnetic material in either of the tubes 42 and 44. The tubes 42, 44 and 46 are of substantially the same length; and they are held in spaced, concentric relation to each other and to the openings 14 and 26 by the grooves 18, 20 and 22 and 30, 32 and 34, respectively, in the inner faces of the end walls 12 and 24. The tubes 42, 44 and 46 serve as magnetic shields and serve to keep the space within the tube 46 substantially free of magnetic flux lines from the earth's magnetic field.

The numeral 48 denotes a coil form of non-magnetic material, and that coil form is tubular in configuration. A helical winding 50 is mounted on the exterior of that coil form, as shown particularly by FIG. 2. The left-hand end of the coil form 48 and the left-hand end 52 of the winding 50 extend through a collar 51 which is seated within the annular recess 16 in the inner face of the front wall 12. That left-hand end of that coil form and that left-hand end of that winding also extend through the opening 14 in that front wall; and that left-hand end of that winding extends to, and is held by, a terminal 54 which is mounted on, and which extends outwardly beyond, the left-hand face of the front wall 12. The right-hand end of the coil form 48 and the right-hand end 56 of the winding 50 extend through a collar 53 which is seated within the annular recess 28 in the inner face of the rear wall 24. The right-hand end of that coil form and the right-hand end of that winding also extend through the opening 26 in the rear wall 24; and the right-hand end 56 of the winding 50 extends to and is held by a terminal 58. That terminal is secured to, and extends beyond the outer face of, the rear wall 24. The collars 51 and 53 are preferably made from plastic, fiber, rubber, synthetic rubber, or the like. Suitable conductors, not shown, will be used to connect the terminals 54 and 58 to a suitable source of direct current.

A rod-like conductor 60, of a conductive material such as brass, extends through alined openings in the front and rear walls 12 and 24; and those openings are disposed radially inwardly of the tube 46 but are disposed radially outwardly of the coil form 48. Similar rod-like conductors 62, 64 and 66 extend through similar alined openings in the front and rear walls 12 and 24. The rod-like conductors 60 and 64 are disposed on a vertically-directed diameter of the tubes 42, 44 and 46; and the rod-like conductors 62 and 66 are disposed on a horizontally-directed diameter of those tubes.

A rod-like conductor 68, of a conductive material such as brass, extends through alined openings in the front and rear walls 12 and 24; and those openings are disposed radially outwardly of the tube 42. Similar rod-like conductors 70, 72 and 74 extend through similar alined openings in the front and rear walls 12 and 24. The rod-like conductors 68 and 72 are disposed on a diameter which extends from upper left to lower right in FIG. 1, and the rod-like conductors 70 and 74 are disposed on a diameter which extends from upper right to lower left in FIG. 1.

The opposite ends of the rod-like conductors 60, 62, 64, 66, 68, 70, 72 and 74 are threaded; and each of those rod-like conductors has a nut and a washer at each end thereof. Those washers abut the inner faces of the front and rear walls 12 and 24; and those nuts and washers establish and maintain a minimum distance between the inner faces of the front and rear walls 12 and 24. That minimum distance is shorter than the length of any of the tubes 42, 44 and 46; and hence the grooves 18, 20 and 22 in the inner face of the front wall 12 and the grooves 30, 32 and 34 in the inner face of the rear wall 24 will telescope over the ends of the tubes 42, 44 and 46. However, that minimum distance is long enough to keep the front and rear walls 12 and 24 from applying distorting forces to any of the tubes 42, 44 and 46. All of this means that the tubes 42, 44 and 46 will be held in assembled relation with the front and rear walls 12 and 24 without being subjected to distorting forces.

A strap-like conductor 78, of a conductive material such as brass, has openings adjacent the opposite ends thereof; and those openings are telescoped over the threaded, rearwardly-extending ends of the rod-like conductors 60 and 70. Washers and nuts are fitted onto those rearwardly-extending ends to hold that strap-like conductor in abutting engagement with the outer face of rear wall 24, to hold the conductor in electrically-conducting relation with the rod-like conductors 60 and 70, and to hold the inner face of rear wall 24 in intimate engagement with the washers that were previously fitted onto the rearwardly-extending ends of the rod-like conductors 60 and 70. A similar strap-like conductor 80 has openings adjacent the opposite ends thereof; and those openings are telescoped over the threaded, forwardly-extending ends of the rod-like conductors 60 and 68. Washers and nuts are fitted onto those forwardly-extending ends to hold that strap-like conductor in abutting engagement with the outer face of front wall 12, to hold that conductor in electrically-conducting relation with the rod-like conductors 60 and 68, and to hold the inner face of front wall 12 in intimate engagement with the washers that were previously fitted onto the forwardly-extending ends of the rod-like conductors 60 and 68. Another similar strap-like conductor 82 has openings adjacent the opposite ends thereof; and those openings are telescoped over the threaded, rearwardly-extending ends of the rod-like conductors 66 and 68. Washers and nuts are fitted onto those rearwardly-extending ends to hold that strap-like conductor in abutting engagement with the outer face of rear wall 24, to hold that conductor in electrically-conducting relation with the rod-like conductors 66 and 68, and to hold the inner face of rear wall 24 in intimate engagement with the washers that were previously fitted onto the rearwardly-extending ends of the rod-like conductors 66 and 68. A further strap-like conductor 84 has openings adjacent the opposite ends thereof; and those openings are telescoped over the threaded, forwardly-extending ends of the rod-like conductors 66 and 74. Washers and nuts are fitted onto those forwardly-extending ends to hold that strap-like conductor in abutting engagement with the outer face of front wall 12, to hold that conductor in electrically-conducting relation with rod-like conductors 66 and 74, and to hold the inner face of front wall 12 in intimate engagement with the washers that were previously fitted onto the forwardly-extending ends of the rod-like conductors 66 and 74. Still another strap-like conductor 86 has openings adjacent the opposite ends thereof; and those openings are telescoped over the threaded, rearwardly-extending ends of the rod-like conductors 64 and 74. Washers and nuts are fitted onto those rearwardly-extending ends to hold that strap-like conductor in abutting engagement with the outer face of rear wall 24, to hold that conductor in electrically-conducting relation with the rod-like conductors 64 and 74, and to hold the inner face of rear wall 24 in intimate engagement with the washers that were previously fitted onto the rearwardly-extending ends of the rod-like conductors 64 and 74. Yet another strap-like conductor 88 has openings adjacent the opposite ends thereof; and those openings are telescoped over the threaded, forwardly-extending ends of the rod-like conductors 64 and 72. Washers and nuts are fitted onto those forwardly-extending ends to hold that strap-like conductor in abutting engagement with the outer face of front wall 12, to hold that conductor in electrically-conducting relation with the rod-like conductors 64 and 72, and to hold the inner face of front wall 12 in intimate engagement with the washers that were previously fitted onto the forwardly-extending ends of the rod-like conductors 64 and 72. A still further strap-like conductor 90 has openings adjacent the opposite ends thereof; and those openings are telescoped over the threaded, rearwardly-extending ends of the rod-like conductors 62 and 72. Washers and nuts are fitted onto those rearwardly-extending ends to hold that strap-like conductor in abutting engagement with the outer face of rear wall 24, to hold that conductor in electrically-conducting relation with the rod-like conductors 62 and 72, and to hold the inner face of rear wall 24 in intimate engagement with the washers that were previously fitted onto the rearwardly-extending ends of the rod-like conductors 62 and 72.

The rod-like conductors 60, 62, 64, 66, 68, 70, 72 and 74 and the strap-like conductors 78, 80, 82, 84, 86, 88 and 90 perform dual functions, namely, they mechanically hold the front and rear walls 12 and 24 in assembled relation with the tubes 42, 44 and 46, and they constitute an electromagnetic winding. The rearwardly-projecting ends of the rod-like conductors 62 and 70 constitute the terminals of that winding; and suitable conductors, not shown, can be used to connect a suitable source of alternating current to those terminals. The winding that is constituted by the rod-like and the strap-like conductors is essentially toroidal in configuration; and such a winding will develop a magnetic field that is directed circumferentially of the tubes 42, 44 and 46.

A spacer ring 92 of non-metallic, non-magnetic material, such as Plexiglas, is telescoped into the space between the right-hand ends of the tubes 42 and 44; and that spacer ring will maintain those right-hand ends concentric with each other even before those right-hand ends are fitted into the concentric grooves 32 and 34 in the inner face of rear wall 24. A similar non-metallic, non-magnetic spacer ring 94 is telescoped into the space between the right-hand ends of the tubes 44 and 46; and that spacer ring will maintain those right-hand ends concentric with each other even before those right-hand ends are fitted into the concentric grooves 30 and 32 in the inner face of rear wall 24.

In the said preferred embodiment of the present invention, the tubes 42, 44 and 46 are about eighteen inches long, the tube 46 is about seven inches in diameter, the tube 44 is about eight inches in diameter, and the tube 42 is about nine inches in diameter. The coil form 48 is about nineteen inches long and is about four inches in diameter. The rod-like conductors 60, 62, 64, 66, 68, 70, 72 and 74 are longer than nineteen inches.

The opposite ends of the coil form 48 are open; and hence the objects to be tested can easily be inserted into the space defined by that coil form. Magnetometers are particularly adapted for insertion into the space defined by coil form 48, but other magnetic-sensitive devices also can be inserted into that space.

It is desirable to dispose the magnetometer, or other magnetic-sensitive device, within the coil form 48 so the magnetic axis of that magnetometer or other magnetic-sensitive device is parallel to the axis of that coil form. Where that is done, the magnetic axis of that magnetometer or other magnetic-sensitive device will be parallel to the axis of the magnetic field generated by the winding 50, and hence a maximal interrelationship will be established between the flux lines generated by the winding 50 and the magnetometer or other magnetic-sensitive device to be tested. The value of the direct current flowing through the winding 50 will be suitably controlled to enable that winding to provide the magnitude of magnetic field needed to test the magnetometer or other magnetic-sensitive device disposed within the coil form 48.

Although the tubes 42, 44 and 46 are made from materials having high values of permeability, those tubes will tend to respond to the magnetic field generated by the winding 50 to become permanently magnetized. The resulting permanent magnetic fields developed by those tubes will be small in value; but, where the magnetometer or other magnetic-sensitive device is very sensitive, even small value magnetic fields are objectionable. The present invention keeps the tubes 42, 44 and 46 from becoming permanently magnetized by causing alternating current to flow through the winding constituted by the rod-like conductors 60, 62, 64, 66, 68, 70, 72 and 74 and by the strap-like conductors 78, 80, 82, 84, 86, 88 and 90. That alternating current will generate an alternating magnetic field which will flow through the tubes 42, 44 and 46 and will recurrently change the orientation of the magnetic domains in those tubes. As a result, those magnetic domains will be unable to assume the fixed orientations which they would need to develop permanent magnetic fields within those tubes.

The value of the alternating current flowing through the winding constituted by the rod-like conductors 60, 62, 64, 66, 68, 70, 72 and 74 and by the strap-like conductors 78, 80, 82, 84, 86, 88 and 90 must be large enough to enforce recurrent changes in the orientation of the magnetic domains in the tubes 42, 44 and 46, but it should be small enough to keep the magnetic material in the tubes 42, 44 and 46 from becoming saturated during any given half-cycle of that alternating current. Because the alternating magnetic field, generated by the alternating current flowing through the winding constituted by the rod-like conductors 60, 62, 64, 66, 68, 70, 72 and 74 and by the strap-like conductors 78, 80, 82, 84, 86, 88 and 90 has gap-free flux paths, in the form of the tubes 42, 44 and 46, because those flux paths are short, and because those flux paths are at right angles to the flux paths for the magnetic field generated by the winding 50, the value of the alternating current can be small. In the said preferred embodiment of the present invention, as few as two ampere turns in the winding constituted by the rod-like conductors 60, 62, 64, 66, 68, 70, 72 and 74 and by the strap-like conductors 78, 80, 82, 84, 86, 88 and 90 develop an alternating magnetic field, within the tubes 42, 44 and 46, in the kilogauss range. The magnitude of such an alternating magnetic field greatly exceeds the magnitude of the magnetic field, in the millioersted range, developed within those tubes by the direct current flowing through the winding 50. As a result, the alternating magnetic field forces recurrent changes to occur in the orientations of the magnetic domains in the tubes 42, 44 and 46; and hence the alternating magnetic field keeps the magnetic field generated by the direct current in the winding 50 from developing permanent magnetic fields within those tubes. All of this means that the present invention keeps permanent magnetic fields from being developed within the tubes 42, 44 and 46 and yet keeps those tubes from saturating, and thus becoming even momentarily ineffective as magnetic shields. Consequently, the present invention makes it possible for a magnetometer or other magnetic-sensitive device to be exposed to a magnetic field of the desired magnitude while being shielded from the earth's magnetic field.

Because the winding constituted by the rod-like conductors 60, 62, 64, 66, 68, 70, 72 and 74 and by the strap-like conductors 78, 80, 82, 84, 86, 88 and 90 essentially constitutes a toroidal winding, the alternating magnetic field developed by that winding will be directed circumferentially of the tubes 42, 44 and 46 and will be perpendicular to the axis of the magnetic field established by the winding 50. This is desirable, where the magnetometer or other magnetic-sensitive device is frequency-sensitive and has its axis parallel to the axis of the winding 50; because such an alternating magnetic field will have only a minimal component thereof parallel to the axis of the magnetometer or other magnetic-sensitive device, and will thus not develop appreciable magnetic alternations parallel to the axis of that magnetometer or other magnetic-sensitive device which could adversely affect the testing of that magnetometer or other magnetic-sensitive device.

If the magnetometer or other magnetic-sensitive device is not frequency-sensitive, and if extra power is available at low cost, a winding, which developed an alternating magnetic field with substantial components parallel to the axis of the magnetic field developed by the winding 50, could be substituted for the winding constituted by the rod-like conductors 60, 62, 64, 66, 68, 70, 72 and 74 and by the strap-like conductors 78, 80, 82, 84, 86, 88 and 90. Such substitute winding could generate a magnetic field that was largely axially-directed or largely circumferentially-directed of the winding 50 or that had magnetic components which were about equally divided between the axial and circumferential directions.

In selecting a frequency for the alternating current supplied to the rearwardly-extending ends of the rod-like conductors 62 and 70, a frequency should be selected which is high enough so it will not interfere with the magnetic field developed by the direct current flowing through the helical winding 50. Yet, that frequency must not be so high that it will unduly limit the extent to which the alternating magnetic field penetrates the tubes 42, 44 and 46. In practice, a frequency of about two thousand cycles per second has been found to be very useful.

If the magnetometer or other magnetic-sensitive device to be tested requires a space larger than that provided by the four inch diameter coil form 48, a larger diameter coil form will be used. In that event, four or more concentric shielding tubes can be used. If the coil form 48 is reduced in size, fewer than three shielding tubes can be used.

In using the testing device of the present invention, it is desirable to set that testing device so the axis of the coil form 48 is perpendicular to the earth's magnetic field and to dispose the axis of the magnetometer or other magnetic-sensitive device so it is parallel to the axis of that coil form. Where that is done, the shielding tubes 42, 44 and 46 are most effective in shielding that magnetometer or other magnetic-sensitive device from the earth's magnetic field.

The rod-like conductore 60, 62, 64, 66, 68, 70, 72 and 74 and the strap-like conductors 78, 80, 82, 84, 86, 88 and 90 are desirable; because they perform the dual function of constituting a winding and constituting structural members. The magnetic field generated by the current flowing through the rod-like conductors 60, 62, 64, 66, 68, 70, 72 and 74 is particularly desirable, because it is directed circumferentially of the coil 50. The magnetic field generated by the current flowing through the strap-like conductors 78, 80, 82, 84, 86, 88 and 90 is axially-directed, rather than circumferentially-directed, of the coil 50; and hence that magnetic field is not desirable. However, the magnetic field generated by the current flowing through the strap-like conductors 78, 80, 82, 84, 86, 88 and 90 is not very effective, because of the small value of current flowing through those conductors and because of the long air-filled flux path for that magnetic field. Consequently, in most instances, that magnetic field can be ignored.

In those instances where the magnetic field generated by the current flowing through the strap-like conductors 78, 80, 82, 84, 86, 88 and 90 can not be ignored, that magnetic field can easily be neutralized. For example, a second set of rod-like conductors and a second set of strap-like conductors could be used in addition to the rod-like conductors 60, 62, 64, 66, 68, 70, 72 and 74 and the strap-like conductors 78, 80, 82, 84, 86, 88 and 90; but the second set of strap-like conductors would be connected to generate a magnetic field that bucked the magnetic field generated by the strap-like conductors 78, 80, 82, 84, 86, 88 and 90. Specifically, the second set of strap-like conductors would have the strap-like conductors adjacent the front wall 12 generally in register with the strap-like conductors 78, 82, 86 and 90, and would have the strap-like conductors adjacent the rear wall 24 generally in register with the strap-like conductors 80, 84, and 88. Where that was done, the magnetic field generated by the second set of rod-like conductors and the second set of strap-like conductors would aid the circumferentially directed magnetic field generated by the rod-like conductors 60, 62, 64, 66, 68, 70, 72 and 74 and the strap-like conductors 78, 80, 82, 84, 86, 88 and 90 but would buck the axially-directed magnetic field generated by the strap-like conductors 78, 80, 82, 84, 86, 88 and 90.

Whereas the drawing and accompanying description have shown and described a preferred embodiment of the present invention it should be apparent to those skilled in the art that various changes can be made in the form of the invention without affecting the scope thereof.

What we claim is:

1. A testing device for magnetic-sensitive devices that comprises:
   (a) a tubular coil form of non-metallic, non-magnetic material,
   (b) a coil wound onto said coil form,
   (c) a tubular shield of high permeability magnetic material telescoped over and concentric with said coil form and said coil,
   (d) a second tubular shield of high permeability magnetic material telescoped over the first said tubular shield, said coil form, and said coil,
   (e) a third tubular shield of high permeability magnetic material telescoped over the first said tubular shield, said second tubular shield, said coil form, and said coil,
   (f) said coil form, said coil, and said tubular shields being concentric,
   (g) said coil and the first said tubular shield coacting to define an annular space therebetween,
   (h) a plurality of rod-like conductors disposed within said annular space and co-axial with said coil,
   (i) further rod-like conductors disposed outwardly of said third tubular shield and co-axial with said coil, and
   (j) strap-like conductors, at the opposite ends of the first said and said further rod-like conductors, that interconnect the first said and said further rod-like conductors to form a second winding,
   (k) said winding on said coil form being helical in configuration,
   (l) said second winding being toroidal in configuration,
   (m) said coil form defining a space adapted to receive a magnetometer or other magnetic-sensitive device to be tested,
   (n) said winding on said coil form being connectable to a source of direct current to develop a magnetic field within said space in said coil form for testing said magnetometer or other magnetic-sensitive device,
   (o) said tubular shields being adapted to substantially shield said magnetometer or other magnetic-sensitive device from the earth's magnetic field,
   (p) said second winding being connectable to a source of alternating current to develop an alternating magnetic field within said tubular shields,
   (q) said alternating magnetic field having a frequency which is high enough to avoid interference with the direct magnetic field generated by said winding on said coil form but which is low enough to facilitate penetration of said tubular shields by said alternating magnetic field,
   (r) said alternating magnetic field having a magnitude that is large enough to force recurrent changes in the orientations of the magnetic domains within said tubular shields but that is small enough to prevent saturation of said tubular shields.

2. A testing device for magnetic-sensitive devices that comprises:
   (a) a tubular coil form of non-magnetic material,
   (b) a coil wound onto said coil form,
   (c) a tubular shield of high permeability magnetic material telescoped over said coil form and said coil,
   (d) a second tubular shield of high permeability magnetic material telescoped over the first said tubular shield, said coil form, and said coil,
   (e) a third tubular shield of high permeability magnetic material telescoped over the first said tubular shield, said second tubular shield, said coil form, and said coil,
   (f) said coil form and the first said tubular shield coacting to define an annular space therebetween,
   (g) a plurality of rod-like conductors disposed within said annular space and co-axial with said coil form,
   (h) further rod-like conductors disposed outwardly of said third tubular shield and co-axial with said coil form, and
   (i) strap-like conductors, at the opposite ends of the first said and said further rod-like conductors, that interconnect the first said and said further rod-like conductors to form a second winding,
   (j) said second winding being toroidal in configuration,
   (k) said coil form defining a space adapted to receive a magnetometer or other magnetic-sensitive device to be tested,
   (l) said winding on said coil form being connectable to a source of direct current to develop a magnetic field within said space in said coil form for testing said magnetometer or other magnetic-sensitive device,
   (m) said tubular shields being adapted to substantially shield said magnetometer or other magnetic-sensitive device from the earth's magnetic field,
   (n) said second winding being connectable to a source of alternating current to develop an alternating magnetic field within said tubular shields,
   (o) said alternating magnetic field having a frequency which is high enough to avoid interference with the direct magnetic field generated by said winding on said coil form but which is low enough to facilitate penetration of said tubular shields by said alternating magnetic field,
(p) said alternating magnetic field having a magnitude that is large enough to force recurrent changes in the orientations of the magnetic domains within said tubular shields but that is small enough to prevent saturation of said tubular shields.

3. A testing device for magnetic-sensitive devices that comprises:
(a) a tubular coil form of non-magnetic material,
(b) a coil wound onto said coil form,
(c) a plurality of tubular shields of high permeability magnetic material telescoped over said coil form and said coil,
(d) said coil form and the innermost of said tubular shields coacting to define an annular space therebetween,
(e) a plurality of rod-like conductors disposed within said annular space and co-axial with said coil form,
(f) further rod-like conductors disposed outwardly of the outermost of said tubular shields and co-axial with said coil form, and
(g) strap-like conductors, at the opposite ends of the first said and said further rod-like conductors, that interconnect the first said and said further rod-like conductors to form a second winding,
(h) said second winding being toroidal in configuration,
(i) said coil form defining a space adapted to receive a magnetometer or other magnetic-sensitive device to be tested,
(j) said winding on said coil form being connectable to a source of direct current to develop a magnetic field within said space in said coil form for testing said magnetometer or other magnetic-sensitive device,
(k) said second winding being connectable to a source of alternating current to develop an alternating magnetic field within said tubular shields,
(l) said alternating magnetic field having a frequency which is high enough to avoid interference with the direct magnetic field generated by said winding on said coil form but which is low enough to facilitate penetration of said tubular shields by said alternating magnetic field,
(m) said alternating magnetic field having a magnitude that is large enough to force recurrent changes in the orientations of the magnetic domains within said tubular shields but that is small enough to prevent saturation of said tubular shields.

4. A testing device for magnetic-sensitive devices that comprises:
(a) a tubular coil form of non-magnetic material,
(b) a coil wound onto said coil form,
(c) a plurality of tubular shields of high permeability magnetic material telescoped over said coil form and said coil,
(d) said coil form and the innermost of said tubular shields coacting to define an annular space therebetween,
(e) a plurality of rod-like conductors disposed within said annular space,
(f) further rod-like conductors disposed outwardly of the outermost of said tubular shields,
(g) strap-like conductors, at the opposite ends of the first said and said further rod-like conductors, that interconnect the first said and said further rod-like conductors to form a second winding,
(h) said coil form defining a space adapted to receive a magnetometer or other magnetic-sensitive device to be tested,
(i) said winding on said coil form being connectable to a source of direct current to develop a magnetic field within said space in said coil form for testing said magnetometer or other magnetic-sensitive device, (j) said second winding being connectable to a source of alternating current to develop an alternating magnetic field within said tubular shields,
(k) said alternating magnetic field having a frequency which is high enough to avoid interference with the direct magnetic field generated by said winding on said coil form but which is low enough to facilitate penetration of said tubular shields by said alternating magnetic field,
(l) said alternating magnetic field having a magnitude that is large enough to force recurrent changes in the orientations of the magnetic domains within said tubular shields.

5. A testing device for magnetic-sensitive devices that comprises:
(a) a tubular coil form of non-magnetic material,
(b) a coil wound onto said coil form,
(c) a plurality of tubular shields of high permeability magnetic material telescoped over said coil form and said coil,
(d) said coil form and the innermost of said tubular shields coacting to define an annular space therebetween,
(e) a plurality of rod-like conductors disposed within said annular space,
(f) further rod-like conductors disposed outwardly of the outermost of said tubular shields,
(g) strap-like conductors, at the opposite ends of the first said and said further rod-like conductors, that interconnect the first said and said further rod-like conductors to form a second winding,
(h) said coil form defining a space adapted to receive a magnetometer or other magnetic-sensitive device to be tested,
(i) said winding on said coil form being connectable to a source of direct current to develop a magnetic field within said space in said coil form for testing said magnetometer or other magnetic-sensitive device,
(j) said second winding being connectable to a source of alternating current to develop an alternating magnetic field within said tubular shields.

6. A testing device for magnetic-sensitive devices that comprises:
(a) a winding,
(b) a plurality of shields of high permeability magnetic material adjacent said winding, and
(c) a second winding,
(d) the first said winding being generally helical in configuration,
(e) said second winding being generally toroidal in configuration,
(f) the first said winding being connectable to a source of direct current to develop a magnetic field for testing said magnetic-sensitive devices,
(g) said plurality of shields being adapted to substantially shield said magnetic-sensitive devices from the earth's magnetic field,
(h) said second winding being connectable to a source of alternating current to develop an alternating magnetic field within said plurality of shields,
(i) said alternating magnetic field having a frequency which is high enough to avoid interference with the direct magnetic field generated by the first said winding but which is low enough to facilitate penetration of said plurality of shields by said alternating magnetic field,
(j) said alternating magnetic field having a magnitude that is large enough to force recurrent changes in the orientations of the magnetic domains within said plurality of shields but that is small enough to prevent saturation of said plurality of shields,
(k) the axis of the first said winding being angularly displaced from the axis of said second winding.

7. A testing device for magnetic-sensitive devices that comprises:
(a) a winding,
(b) a shield of high permeability magnetic material adjacent said winding, and
(c) a second winding,
(d) the first said winding being connectable to a source of direct current to develop a magnetic field for testing said magnetic-sensitive devices,
(e) said shield being adapted to substantially shield said magnetic-sensitive devices from the earth's magnetic field,
(f) said second winding being connectable to a source of alternating current to develop an alternating magnetic field within said shield,
(g) said alternating magnetic field having a frequency which is high enough to avoid interference with the direct magnetic field generated by the first said winding but which is low enough to facilitate penetration of said shield by said alternating magnetic field,
(h) said alternating magnetic field having a magnitude that is large enough to force recurrent changes in the orientations of the magnetic domains within said shield but that is small enough to prevent saturation of said shield,
(i) the axis of the first said winding being angularly displaced from the axis of said second winding.

8. A testing device for magnetic-sensitive devices that comprises:
(a) a winding,
(b) a shield of high permeability magnetic material adjacent said winding, and
(c) a second winding,
(d) the first said winding being connectable to a source of direct current to develop a magnetic field for testing said magnetic-sensitive devices,
(e) said second winding being connectable to a source of alternating current to develop an alternating magnetic field within said shield,
(f) said alternating magnetic field having a frequency which is high enough to avoid interference with the direct magnetic field generated by the first said winding but which is low enough to facilitate penetration of said shield by said alternating magnetic field,
(g) said alternating magnetic field having a magnitude that is large enough to force recurrent changes in the orientations of the magnetic domains within said shield but that is small enough to prevent saturation of said shield.

9. A testing device for magnetic-sensitive devices that comprises:
(a) a winding,
(b) a shield of high permeability magnetic material adjacent said winding, and
(c) a second winding,
(d) the first said winding being connectable to a source of direct current to develop a magnetic field for testing said magnetic-sensitive devices,
(e) said second winding being connectable to a source of alternating current to develop an alternating magnetic field within said shield,
(f) said shield substantially shielding said magnetic-sensitive devices from external magnetic fields, and
(g) said alternating magnetic field having a magnitude large enough to force recurrent changes in the orientations of the magnetic domains within said shield but small enough to prevent saturation of said shield.

References Cited

UNITED STATES PATENTS

| | | |
|---|---|---|
| 2,623,923 | 12/1952 | Zimmerman. |
| 2,644,922 | 7/1953 | Sewell _____ 336—84 X |
| 2,864,963 | 12/1958 | Dornstreich et al. _____ 307—91 |
| 3,218,547 | 11/1965 | Ling _____ 324—47 X |

LEE T. HIX, *Primary Examiner*.